(12) United States Patent
Chu (10) Patent No.: US 6,400,692 B1
(45) Date of Patent: Jun. 4, 2002

(54) METHOD FOR TRANSMITTING DATA IN A WIRELESS MODEM NETWORK

(75) Inventor: Hsiao-Chiu Chu, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/093,872

(22) Filed: Jun. 9, 1998

(30) Foreign Application Priority Data

Jun. 10, 1997 (TW) ......................................... 86107995 A (51) Int. Cl.[7] .............................................. H04L 12/46
(52) U.S. Cl. ....................................... 370/254; 370/238
(58) Field of Search ................................. 370/254, 449, 370/277, 238; 455/9, 11.1; 375/222

(56) References Cited

U.S. PATENT DOCUMENTS 5,535,195 A * 7/1996 Lee

* cited by examiner

Primary Examiner—Douglas Olms
Assistant Examiner—Ken Vanderpuye
(74) Attorney, Agent, or Firm—Powell, Goldstein, Frazer & Murphy, LLP (57) ABSTRACT

A method for transmitting data in a wireless modem network including a plurality of wireless modems is disclosed herein. The method mentioned above includes the following steps. First, classify the plurality of wireless modems into a plurality of groups. Next, select a plurality of group masters. Every group master is selected from the wireless modems enclosed by the group enclosing the group master. Subsequently, when a wireless modem wants to broadcast a data, if the wireless modem is not a group master, then the wireless modem transmits the data to the group master that dominates the wireless modem. Next, begin at the group master mentioned above; check whether any of the plurality of the group masters has not received the data. If there is any group master having not received the data, then any of the group masters that has received the data transmits the data to the farthest group master that has not received the data. Then use an interior header of a plurality of interior header to record whether the plurality of wireless modem within any group has received the data from the plurality of wireless modem within the first group. Besides, use exterior header to record whether the plurality of group masters has not received the data. The following step is to build a plurality of communication chains between the plurality of wireless modems having not received the information and the plurality of wireless modems having received the data. Finally transmits the data through the plurality of communication chains until all of the wireless modems receive the data.

5 Claims, 7 Drawing Sheets

Fig.4A group master:  2  15  12  34  25

| 1 | 0 | 0 | 0 | 0 |
|---|---|---|---|---|

Fig.4B group master:  2  15  12  34  25

| 1 | 0 | 0 | 0 | 1 |
|---|---|---|---|---|

Fig.4C group master:  2  15  12  34  25

| 1 | 0 | 0 | 0 | 1 |
|---|---|---|---|---|

Fig.4D group master:  2  15  12  34  25

| 1 | 1 | 1 | 0 | 1 |
|---|---|---|---|---|

METHOD FOR TRANSMITTING DATA IN A WIRELESS MODEM NETWORK

BACKGROUND OF THE INVENTION

1. Field of the Invention

This invention relates to a method for transmitting data in a wireless modem network, and particularly relates to a method for transmitting data in a wireless modem network using a same frequency.

2. Description of the Prior Art

When data transmission proceeds in a wireless network, the wireless modem is widely used to transmit the data. In the wireless network, the wireless modem is treated as a point. When the data transmission is to be performed, the data can only be transmitted from a point to the other point at a time. In other words, the wireless modem can only connect the other one at a time. So it takes a lot of time to broadcast the data from a point to the other points on the wireless network. This is particularly true when the broadcast is to be performed from a point to all the other points using the same band, the data can only be transmitted one by one, so it takes a lot of time. Furthermore, the wireless communication tends to be blocked when the broadcasting occurs between the points, using a band.

SUMMARY OF THE INVENTION

When the broadcast is performed from a wireless modem (point) to all the other wireless modems (points) using the same band, the data can only be transmitted one by one, so this takes a lot of time. Furthermore, the wireless communication tends to be blocked when the broadcasting is proceeded between the points, using a band.

The present invention proposes a method for transmitting data in a wireless modem network including a plurality of wireless modems. The method mentioned above includes the following steps. First, the plurality of wireless modems are classified into a plurality of groups. Next, a plurality of group masters are selected. Every group master is selected from the wireless modems enclosed by the group enclosing the group master. The group master is chosen by selecting the wireless modem that having a minimum average distance to the plurality of wireless modems within the group enclosing the group master.

Subsequently, when a wireless modem wants to broadcast data, if the wireless modem is not a group master, then the wireless modem transmits the data to the group master that dominates the wireless modem. Next, the starting point is at the group master mentioned above; a check is made of whether any of the plurality of the group masters has not received the data. If there is any group master having not received the data, then any of the group masters that has received the data transmits the data to the farthest group master that has not received the data. Then a plurality of interior headers is used to record whether the plurality of wireless modems within any group has received the data from the plurality of wireless modems within the first group. In addition, a plurality of exterior headers is used to record whether the plurality of the group masters has not received the data.

The following step is to build a plurality of communication chains between the plurality of wireless modems having not received the information and the plurality of wireless modems having received the data. The rule limiting the building of the communication chain that interferes with the communication of any of the plurality of communication chains. Finally transmits the data through the plurality of communication chains until all of the wireless modems receive the data.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

The present invention aims at the broadcasting between the wireless modems in the wireless network. The wireless modem is treated as a point in a wireless network. Especially when the wireless modems in the wireless network uses the same band, if there are data transmitted from a point to the other points, the present invention provides a method for reducing transmission time without additional hardware. Because the present invention provides a method for the broadcast between the points without transmission data from a point to all the other points one by one. Instead, the data is transmitted from a point to a master point, then the master point transmits the data to the other master points of the individual group. Finally, every master point in every group transmits the data to all the other points of the individual group. The transmission between two points is defined as a communication chain. The transmission power of the wireless modem used in the present invention is adjustable, or, in other words, the transmission of the wireless modem can be selected. Thus the interference between different communication chains is spared, and the different communication chains can exist at a time, so the transmission time from a point to all the other points is greatly reduced. Because the traditional wireless modem enables the adjusting of the transmission power of the wireless modem, the structure of the wireless modem used in the preferred embodiment of the present invention is not detailed herein.

Figure 1:
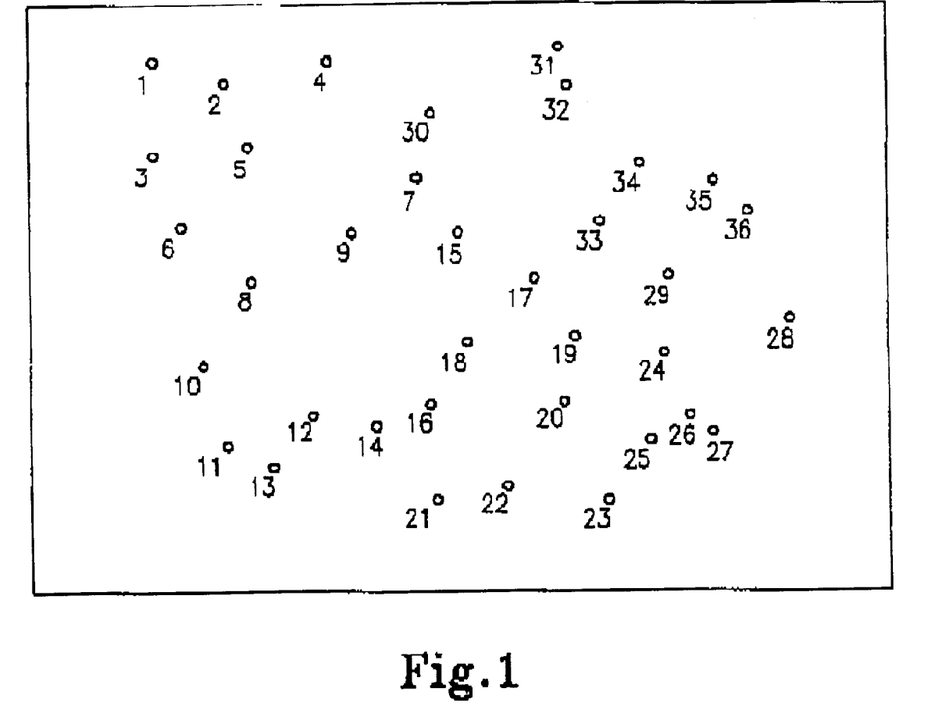
FIG. 1 illustrates an example of the position of all the points (stations) in the wireless modem network before classifying the points into groups.

According to the prior art, when there are many wireless modems that will broadcast data, every one of the wireless modems can transmit data. Assuming there are 36 wireless modems, i.e. there are 36 stations in a wireless network. The relation of the 36 stations is illustrated in FIG. 1, which is under the occurrence before classifying group, i.e. the 36 stations are individual stations. In other words, before immerging a station into the other station, the stations are independent to each other, and the number of the group of the station is 36. All the stations mentioned above can be classified into 5 groups through the summarization of the relative position of all the stations. After the classification of all the stations in the wireless network, a station is chosen in a group to be the group master. The group master is determined by a rule that the group master can have the best communication with the other stations. The group master can be chosen according to the aforementioned rule under various communication conditions. When there is not a communication barrier between stations, the rule is to choose a station that has the minimum distance between all stations and the group master.

Figure 2:
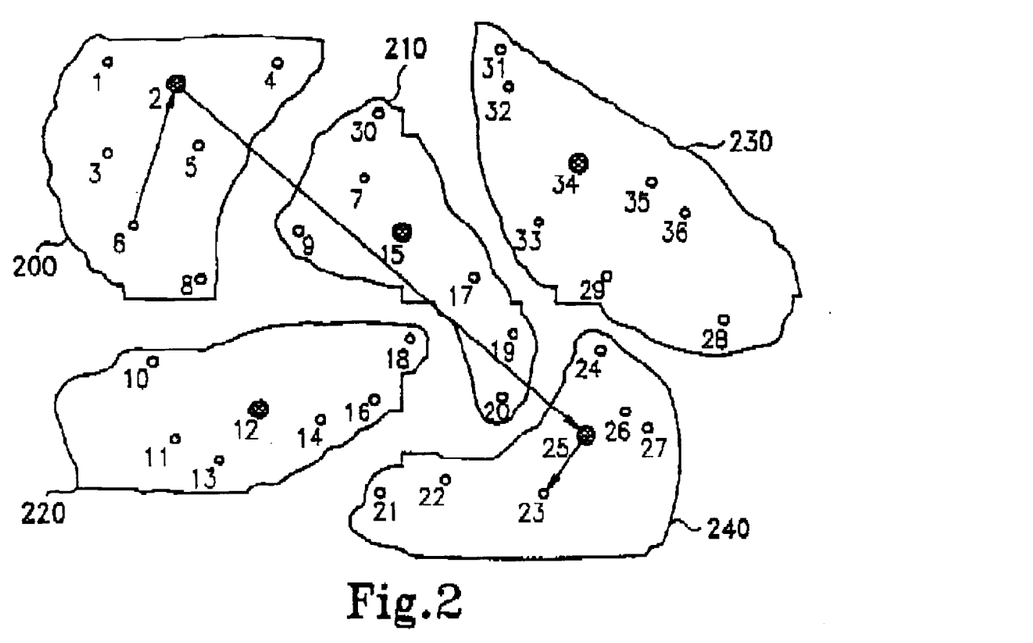
FIG. 2 illustrates the conduction that a point transmits the data (not broadcasting) to the other point after the points are classified into groups.

After the stations are classified into 5 groups, and referring to FIG. 2, there are group 200, group 210, group 220, group 230 and group 240. Every one has a group master 2, group master 15, group master 12, and group master 25 respectively. Whenthe data is to be transmitted (not broadcast) from a source station to the destination station of the other group, at the beginning, the data will be sent from the source station to the source group master of the group that encloses the source station. Then the data is transmitted from the source group mater to the destination group master of the group that enclosing the destination station. Finally the data is transmitted from the destination group master to the destination station. As shown in FIG. 2, if the data is to be transmitted from station 6 of the group 200 to the station 23, the station 6 will send the data to the group master 2 of group 200 enclosing station 6 at the beginning. Then the group master 2 transmits the data to station 23 of the group 240 according to the station-group master mapping table. The station-group master mapping table is used to record the stations and the group master owned by every group. So when the data transmission is performed between different groups, through the station-group master mapping table, the data is transmitted to the group master of the group enclosing the destination station at the beginning. Then the data is transmitted from the group master of the group that enclosing the destination station to the destination station.

Figure 3A:
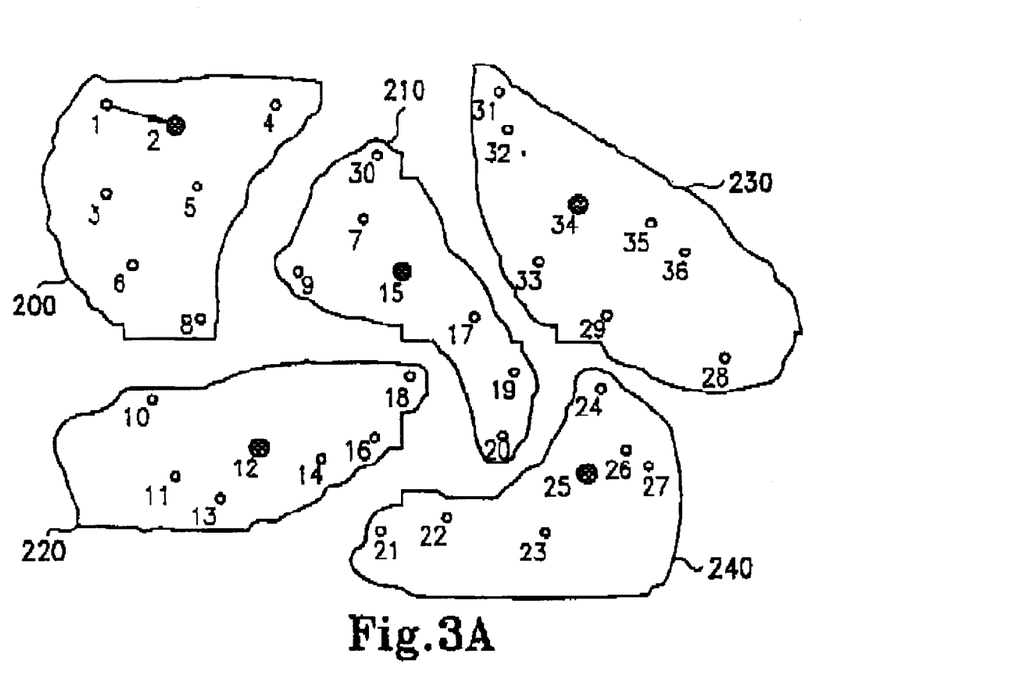
FIGS. 3A–3E illustrate the propagation of the data when the wireless modem network is broadcasting the data according to the preferred embodiment of the present invention.
Figure 3B:
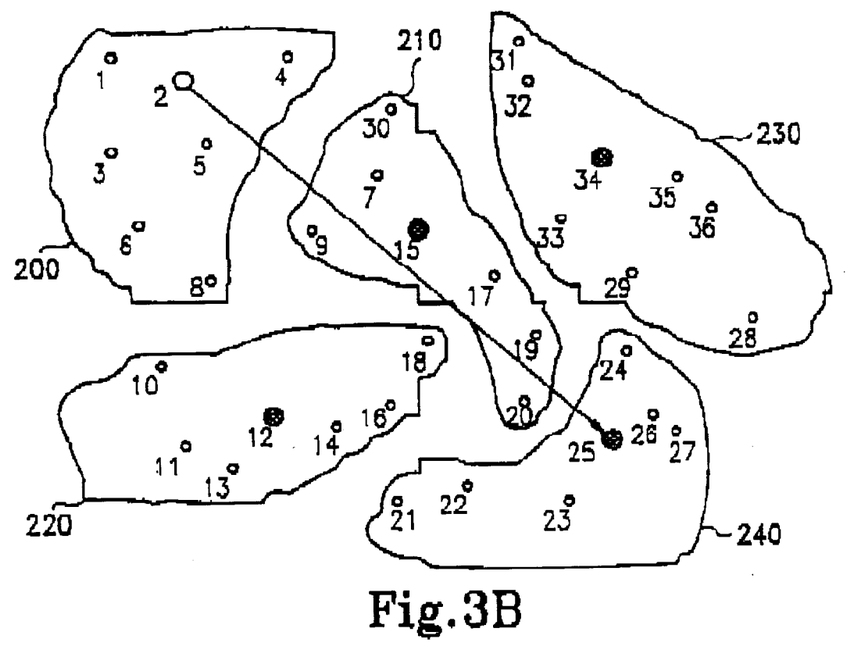
Figure 3C:
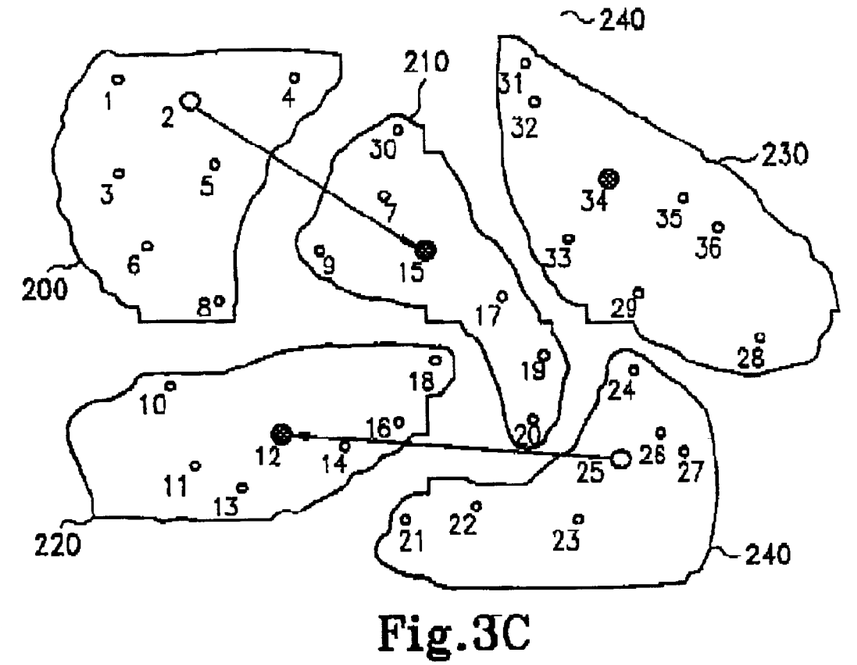
Figure 3D:
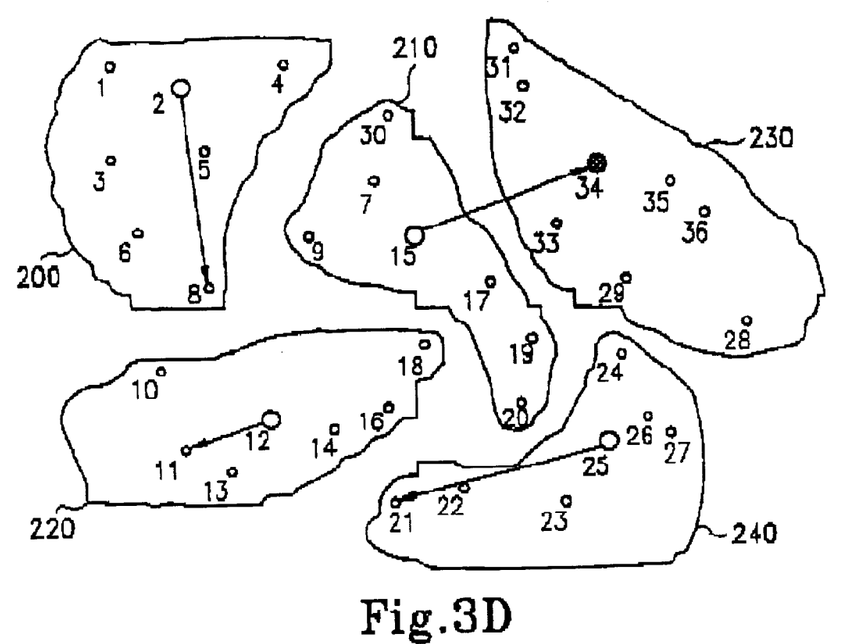
Figure 3E:
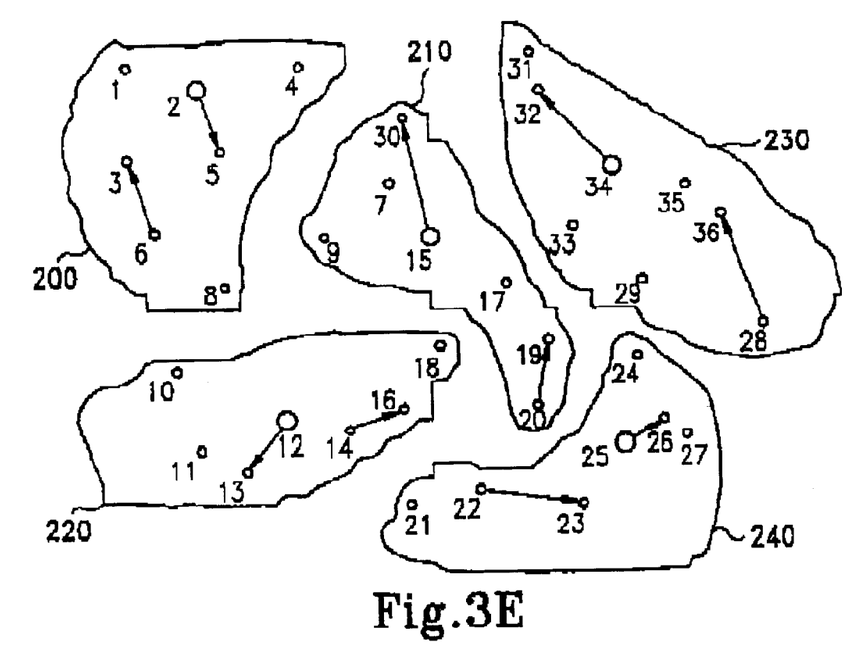

When the data is to be broadcast to all the stations, at the beginning, the data will be sent from the source station to the source group master of the group that encloses the source station. Then the data is transmitted from the source group master to the destination group master of the group that encloses the destination station. Finally the data is transmitted from the destination group master to the destination station. For example, referring to FIG. 3A, if the data in station 1 is to be broadcast, at the beginning, the data is transmitted from station 1 to the group master 2 of the group 200. Then the data is transmitted from the group master 2 to the farthest group master 25 as shown in FIG. 3B. Subsequently, the data is transmitted between all the group masters until all the group masters acquire the transmitted data as shown in FIG. 3C. After all the group masters acquire the data, the group master starts to transmit the data to the stations of the same group enclosing the group master as shown in FIG. 3D. Then the data is transmitted between one and the other station as shown in FIG. 3E. Through the procedure mentioned above, the stations in all the groups can obtain the data, and the broadcasting procedure is finished.

Figure 4A:
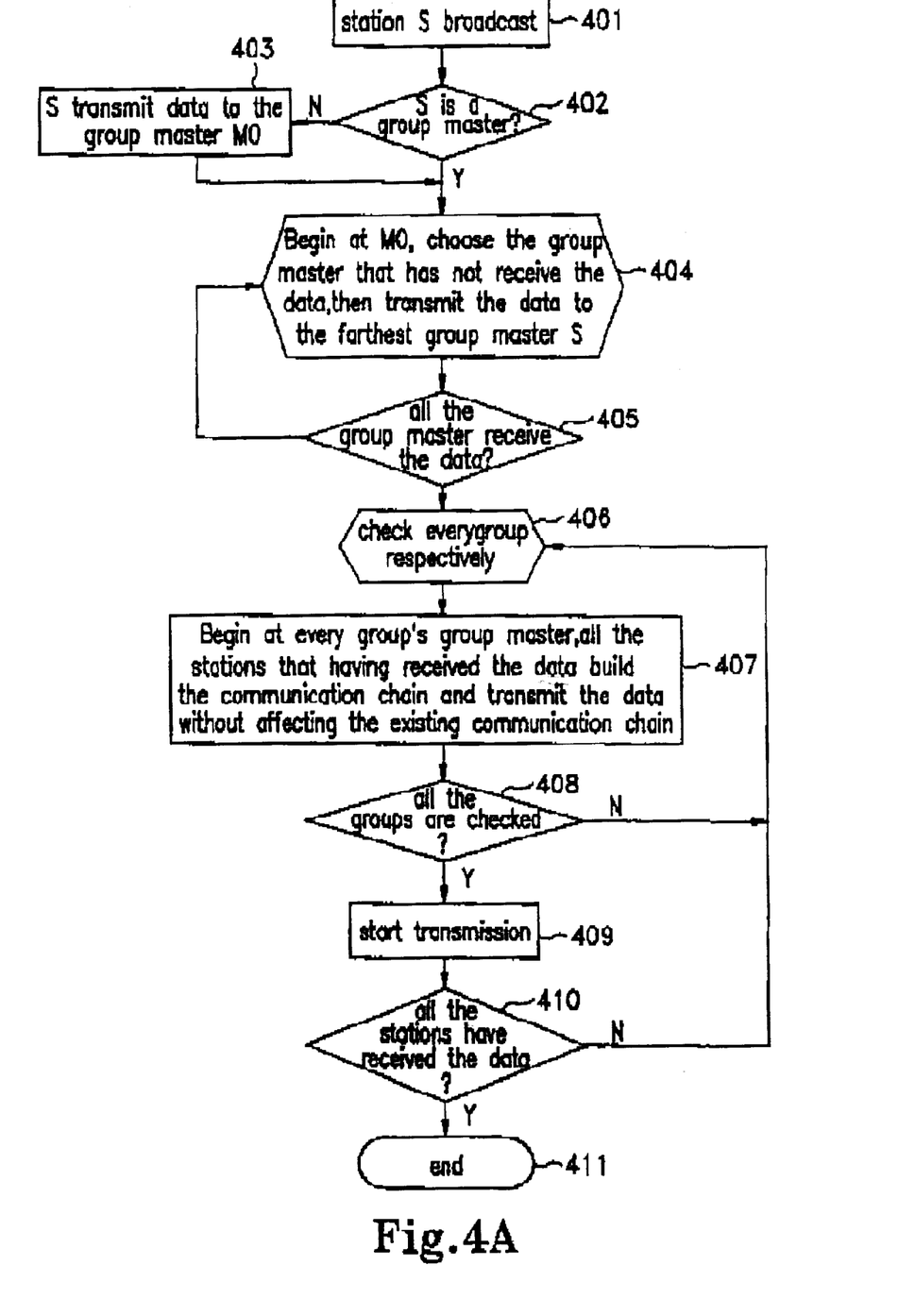
FIG. 4A illustrates the steps of the method for broadcasting data in a wireless modem network according to the preferred embodiment of the present invention.

The flow chart illustrating the broadcasting is shown in FIG. 4A, assume the station S will broadcast, the data transmission can be determined according to the flow chart shown in FIG. 4A. At first, step 401 "station S broadcast" starts the broadcasting procedure, then step 402 "S is a group master" determines whether station S is a group master. If the station S is not a group master, proceed steep 403 "S transmit data to the group master MO". Thus the data is transmitted to the group master MO that is the group master of the group enclosing the stations including S. If the station S is a group master, then proceed step 404 "begin at MO, choose the group master that has not receive the data, then transmit the data to the farthest group master S". Thus the data is transmitted from the station S to the group master that farthest from the group master dominating the station S. The next step 405 "all the group master receive the data" determine whether all the group master have received the data. If a group master has not receive the data, then process step 404, or proceed with the step 406 "check every group respectively" to check whether every station in the respective group has received the data. Then process step 407 "begin at every group's group master, all the stations that having received the data build the communication chain and transmit data without affecting the existing communication chain". Thus in every group, all the stations that have received the data begin transmitting the data to the stations that have not received the data under the condition that the new-built communication chain can not affect the existing communication chain. If a communication chain will interfere with any existing communication chain, then stop building the communication chain. In other words, inside every group, the stations that have received the data start to build a communication chain only when the communication chain that is to be built will not affect the existing communication chain in the resident group or the other groups. The next step is to proceed with step 408 "all the groups are checked?" to determine whether all the groups are checked. If there is a group has not finishing checking, process step 406 and the following steps. On the contrary, if all the groups are checked process step 409 "start transmission". The step 406, 407 and 408 continuous until every group are checked. In step 409, the data is transmitted through all the communication chains. The step 410 "all the stations have received the data?" determines whether all the stations have received the data. If a station have not receive the data, then proceed with step 406 and the following steps till all the stations have receive the data. Then the final step 411 "end" terminates the broadcasting procedure, thus the data is transmitted to every station in every group.

As mentioned in step 406, it is necessary to check whether every group master receives the data, so the same algorithm is used in every group master. Thus after a group master received the data, the other group master that will receive the data can be determined. Furthermore, when the group master transmits the data to the other group master, a header is sent to the other group master simultaneously. The aforementioned header includes the information about which group master has received the data. So when a resident group master has received a header, the group master that has received the data is informed of the resident group master. The header transmitted from a group master to the station is defined as an interior header in the preferred embodiment of the present invention. Besides, the algorithm used by every group master is the same. So the resident group master can figure out which group master will receive the data after the group master received the data from the resident group master.

Figure 4B:
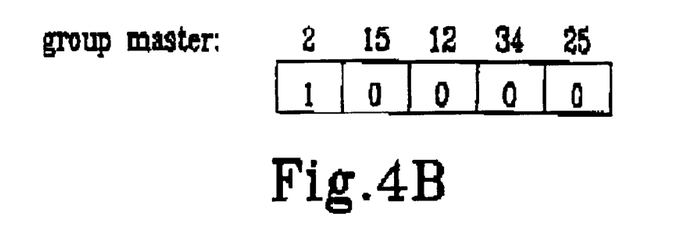
FIG. 4B illustrates the exterior header from group master 2 to master 25 used in the method for broadcasting data in a wireless modem network according to the preferred embodiment of the present invention.

During the transmission of the data, the header mentioned above can be illustrated as the following example. If the algorithm used by every group master transmits the data to the farthest group master, for example, after the data is received, group master 2 will transmit the data to group master 25. So the structure of the header transmitted from group master 2 to group master 25 is figured as that shown in FIG. 4B. After the group master 25 has received the data, the algorithm in the group master 2 figures out that the group master 15 is the farthest group master from the group master 2. Because the algorithm of the group master 25 is the same as that of the group master 2, so the group master 25 figures out that the group master 2 will transmits the data to the group master 15. Thus the group master 25 will transmit the data to the group master that farthest from the group master 25. When the farthest group master from the group master 25 is also the group master 15. The group master 25 will transmit the data to the group master 12, because the group master 12 is the farthest group master from group master 25 when the group master 15 is out of consideration.

Figure 4C:
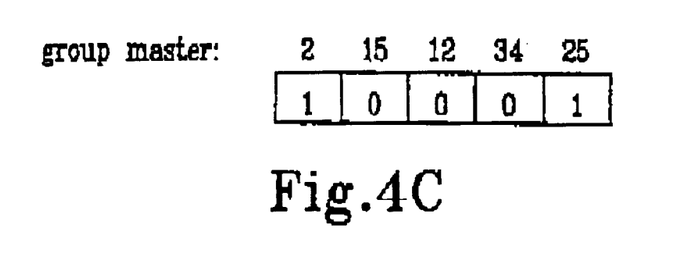
FIG. 4C illustrates the exterior header from group master 2 to master 15 used in the method for broadcasting data in a wireless modem network according to the preferred embodiment of the present invention.
Figure 4D:
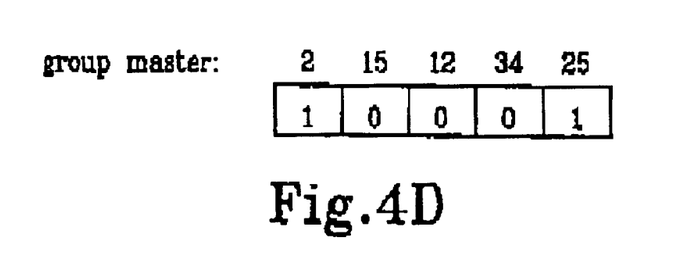
FIG. 4D illustrates the exterior header from group master 25 to master 12 used in the method for broadcasting data in a wireless modem network according to the preferred embodiment of the present invention.
Figure 4E:
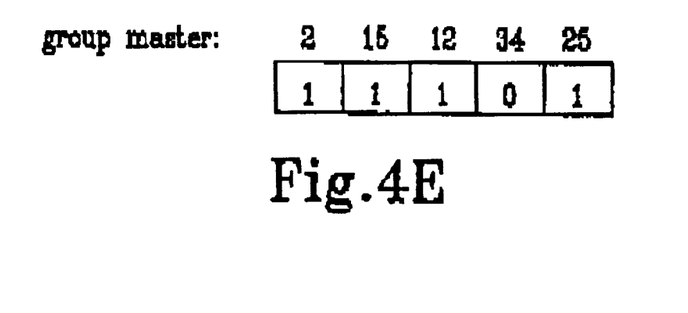
FIG. 4E illustrates the exterior header from group master 15 to master 34 used in the method for broadcasting data in a wireless modem network according to the preferred embodiment of the present invention.

As the group master 2 transmits the data to the group master 15, the structure of the included header is shown in FIG. 4C, and the structure of the header transmitted from the group master 25 to the group master 12 is shown in FIG. 4D. The header transmitted from a group master to the other group master is defined as an exterior header in the preferred embodiment of the present invention. If the group master 15 receives the data prior to the group master 34, the structure of the header transmitted from the group master 15 to the group master 34 is shown in FIG. 4E. Then the group master 12 figures out that every group master has received the data according to the algorithm, and examines every group's group master to check whether all the group masters have received the data. So the header mentioned above is important in proceeding step 405.

In step 407, the method for determining whether all the stations in every group receives the data is similar to the method mentioned above. The other algorithm and the other header are built in all the stations to determine whether all the stations have received the data.

Figure 5:
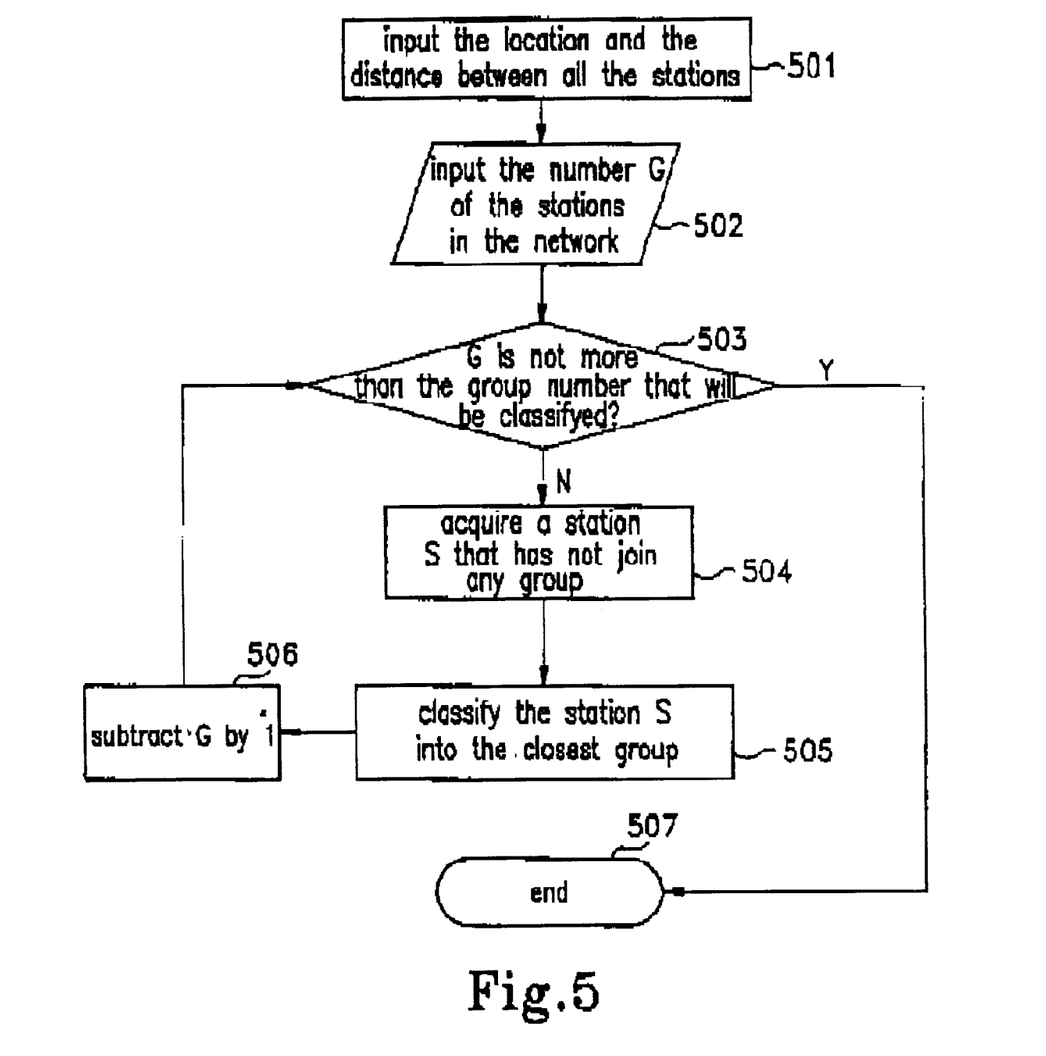
FIG. 5 illustrates the method for classifying the wireless modems that within the wireless modem network into a plurality of groups according to the preferred embodiment of the present invention.

For the above description, the very important basis is "classifying group". The method for classifying the groups is shown in FIG. 5. The step 501 "input the location and the distance between all the stations" input the number of all the stations. In this step, the manager of the wireless modem network can input the distance and the location of all the stations. Then proceed with step 502 "input the number G of the stations in the network" to input the number of all the stations in the wireless modem network. In this step, the manager wireless modem network can input the number of all the stations in the network. Thus the number of all the stations can be used to determine the end of the classifying procedure. Then process step 503 "G is not more than the group number that will be classified" to determine whether the number of the stations is not more than the number of the group that is to be classified. If the number of the stations is smaller than or equal to the number of the group that is to be classified, then process step 507 "end" to terminate this classifying procedure. Otherwise, process step 504 "acquire a station S that has not join any group" to get a station that still not classified into any group. The next step 505 "classify the station S into the closest group" classifies the station S into the group that is closest to the station S. Then proceed with step 506 "subtract G by 1", thus the number of the stations is reduced by 1. Then return the subtracted G to step 503 to process step 503 and the following steps. As described in step 505, the station S is classified into the group according to the average distance between the station S and all the stations of the group. In addition, the group master is acquired by finding the station that has the minimum average distance between the station and the other stations within the group.

The transmission power of the station is adjustable and the transmission power is turned large only when the transmission is proceeded between the group masters. The transmission power within a group is small, so even the transmission is proceeded within several groups, thus interference can be avoided.

As will be understood by persons skilled in the art, the foregoing preferred embodiment of the present invention is illustrative of the present invention rather than limiting the present invention. Having described the invention in connection with a preferred embodiment, the modification will now suggest itself to those skilled in the art. While the preferred embodiment of the invention has been illustrated and described, it will be appreciated that various changes can be made therein without departing from the spirit and scope of the invention.

What is claimed is:

1. A method for transmitting information in a wireless modem network, said wireless modem network having a plurality of wireless modems, comprising:

classifying said plurality of wireless modems into a plurality of groups;

selecting a plurality of group masters by choosing said plurality of wireless modems that are respectively associated with said plurality of groups, said group masters being chosen by selecting said wireless modems having a maximum average signal intensity to said plurality of wireless modems within said group enclosing said group master;

transmitting information and then writing said information to an interior header of a plurality of interior headers by a first wireless modem of said plurality of wireless modems, said plurality of interior headers recording whether said plurality of wireless modems within a first group receive said information from said plurality of wireless modems within said first group;

transmitting said information to a first group master of the first group of said first wireless modems and then writing said information to said interior header when said first wireless modem is not one of said plurality of group masters;

transmitting said information to a second group master when one of said plurality of group masters has not received said information, said second group master being farthest from said first group master;

writing said information to a first exterior header of said first group master and a second exterior header of said second group master, said exterior headers being used to record whether said plurality of group masters receive said information;

transmitting said information to a group master among said plurality of group masters that is farthest from a source transmitting said information and then writing said information to said exterior header of said group master that is farthest from a source transmitting said information when one of said plurality of group masters has not received said information;

building a plurality of communication chains between a first portion of said plurality of wireless modems and a second portion of said plurality of wireless modems according to a rule until said plurality of wireless modems have said plurality of communication chains, wherein said first portion constitutes said plurality of wireless modems that have not received said information and, said second portion constitutes said plurality of wireless modems that have received said information, and said rule stops building a communication chain, if said communication chain interferes with any of said plurality of communication chains; and transmitting said information from said second portion of said plurality of wireless modems to said first portion of said plurality of wireless modems.

2. The method as claim 1, wherein said plurality of wireless modems are classified according to the method comprising:

inputting a number of said plurality of wireless modems;

inputting a position of every one of said plurality of wireless modems;

inputting a distance between every one of said plurality of wireless modems;

grouping said wireless modem that is not dominated by any of said plurality of group masters into a first group of said plurality of wireless modems, until all of said plurality of wireless modems are grouped into said plurality of groups, said wireless modem is nearest to said group master of said first group.

3. The method as claim 1, wherein said group master among said plurality of group masters that is farthest from a source transmitting said information is chosen by selecting said wireless modem having a minimum average distance to said plurality of wireless modems within said group enclosing said group master.

4. A method for transmitting information in a wireless modem network, said wireless modem network having a plurality of wireless modems, comprising:

classifying said plurality of wireless modems into a plurality of groups;

selecting a plurality of group masters by choosing said plurality of wireless modems that are respectively associated with said plurality of groups, said group masters being chosen by selecting said wireless modems having a minimum average distance to said plurality of wireless modems within said group enclosing said group master;

transmitting information and then writing said information to an interior header of a plurality of interior headers by a first wireless modem within said plurality of wireless modems, said interior header recording whether said plurality of wireless modems within a first group receive said information from said plurality of wireless modems within said first group;

transmitting said information to a first group master of a first group enclosing said first wireless modem and then writing said information to said interior header when said first wireless modem is not one of said plurality of group masters;

transmitting said information to a second group master when one of said plurality of group masters have not received said information, said second group master being farthest from said first group master;

writing said information to a first exterior header of said first group master and a second exterior header of said second group master, said exterior headers being used to record whether said plurality of group masters receive said information;

transmitting said information to a group master among said plurality of group masters that is farthest from a source transmitting said information and then writing to said exterior header of said group master that is farthest from a source transmitting said information when one of said plurality of group masters have not received said information;

building a plurality of communication chains between a first portion of said plurality of wireless modems and a second portion of said plurality of wireless modems according to a rule until said plurality of wireless modems have said plurality of communication chains, wherein said first portion constitutes said plurality of wireless modems that have not received said information, and said second portion constitutes said plurality of wireless modems that have received said information, and said rule stops building a communication chain, if said communication chain interferes with any of said plurality of communication chains; and transmitting said information from said second portion of said plurality of wireless modems to said first portion of said plurality of wireless modems.

5. The method as claim 4, wherein said plurality of wireless modems are classified according to the method comprising:

inputting a number of said plurality of wireless modems;

inputting a position of every one of said plurality of wireless modems;

inputting a distance between every one of said plurality of wireless modems;

grouping said wireless modem that is not dominated by any of said plurality of group masters into a first group of said plurality of wireless modems, until all of said plurality of wireless modems are grouped into said plurality of groups, said wireless modem is nearest to said group master of said first group.

* * * * *